(12) United States Patent
Riabov et al.

(10) Patent No.: US 7,891,723 B2
(45) Date of Patent: Feb. 22, 2011

(54) MOTOR VEHICLE WITH A CONVERTIBLE BODY

(76) Inventors: Alexandr Viktorovich Riabov, ul. Sodata Korzuna, d. 58, k. 1, kv. 65, Saint Petersburg, Saint-Petersburg 198260 (RU); Dmitriy Alexandrovich Riabov, ul. Sodata Korzuna, d. 58, k. 1, kv. 65, Saint Petersburg, Saint-Petersburg (RU) 198260

( * ) Notice: Subject to any disclaimer, the term of this patent is extended or adjusted under 35 U.S.C. 154(b) by 305 days.

(21) Appl. No.: 12/002,548

(22) Filed: Dec. 18, 2007

(65) Prior Publication Data

US 2008/0100090 A1 May 1, 2008

Related U.S. Application Data

(63) Continuation of application No. PCT/RU2005/000690, filed on Dec. 29, 2005.

(30) Foreign Application Priority Data

Jul. 4, 2005 (RU) .............................. 2005121511

(51) Int. Cl.
*B60J 7/08* (2006.01)
*B60J 7/20* (2006.01)

(52) U.S. Cl. ...................... 296/108; 296/215

(58) Field of Classification Search ............ 296/107.01, 296/107.08, 108, 107.07, 215
See application file for complete search history.

(56) References Cited

U.S. PATENT DOCUMENTS

| | | | |
|---|---|---|---|
| 3,357,738 A * | 12/1967 | Bourlier | 296/108 |
| 4,634,171 A | 1/1987 | McKeag | |
| 4,854,634 A * | 8/1989 | Shiraishi et al. | 296/108 |
| 5,090,764 A | 2/1992 | Kogawa et al. | |
| 5,195,798 A * | 3/1993 | Klein et al. | 296/146.14 |
| 5,542,735 A * | 8/1996 | Furst et al. | 296/107.18 |

(Continued)

FOREIGN PATENT DOCUMENTS

DE 3733892 A1 * 4/1989

(Continued)

*Primary Examiner*—Glenn Dayoan
*Assistant Examiner*—Paul A Chenevert
(74) *Attorney, Agent, or Firm*—Arent Fox LLP; Michael Fainberg

(57) ABSTRACT

A motor vehicle is provided with a convertible body. The motor vehicle comprises a body provided with seats and a convertible roof, consisting of a front section adjacent to a windscreen frame and a rear section, which is pivotally connected to the rear part of the vehicle. The two sections are hingedly connected to each other and are constructed so that they are capable of rotating relative to each other and to the body from the initial position to the end position and are enabled to be placed in the body rear part. When the convertible roof is placed in the vehicle rear part, the front section thereof occupies substantially a vertical position directly behind the seats and the rear section occupies substantially a horizontal position in the rear part of the vehicle. The front roof section where it is joined to the windscreen frame is shaped to the body bottom shape behind the seats. The front roof section's embodiment allows it to partially overlap the rear section such that at least one part of the front section overlapping the rear section is made of a transparent material.

2 Claims, 5 Drawing Sheets

U.S. PATENT DOCUMENTS

| | | | |
|---|---|---|---|
| 5,649,733 A | 7/1997 | Seel et al. | |
| 6,347,828 B1 | 2/2002 | Rapin et al. | |
| 6,431,636 B1 * | 8/2002 | Schutt | 296/107.18 |
| 6,582,009 B2 * | 6/2003 | Wezyk et al. | 296/180.1 |
| 6,595,572 B2 | 7/2003 | Schuler et al. | |
| 6,786,527 B2 * | 9/2004 | Guillez et al. | 296/107.07 |
| 6,808,222 B2 * | 10/2004 | Quindt | 296/108 |
| 6,955,388 B2 * | 10/2005 | Hasselgruber et al. | 296/108 |
| 7,036,866 B2 * | 5/2006 | Perakis | 296/107.2 |
| 7,150,491 B2 * | 12/2006 | Perakis | 296/107.2 |
| 7,156,446 B2 * | 1/2007 | Perakis | 296/107.2 |
| 2003/0057727 A1 * | 3/2003 | Tohda et al. | 296/107.01 |
| 2004/0061352 A1 | 4/2004 | Guillez et al. | |
| 2004/0080178 A1 * | 4/2004 | Klein et al. | 296/107.08 |
| 2005/0006925 A1 * | 1/2005 | Hahn et al. | 296/107.07 |
| 2006/0131922 A1 * | 6/2006 | Russke | 296/108 |
| 2008/0265610 A1 * | 10/2008 | Condon et al. | 296/107.08 |
| 2008/0296925 A1 * | 12/2008 | Fallis et al. | 296/108 |
| 2009/0096241 A1 * | 4/2009 | Miyajima et al. | 296/37.16 |
| 2009/0230720 A1 * | 9/2009 | Fioravanti | 296/108 |

FOREIGN PATENT DOCUMENTS

| | | | |
|---|---|---|---|
| FR | 2694245 A1 * | 2/1994 | |
| FR | 2695080 A1 * | 3/1994 | |
| FR | 2695081 A1 * | 3/1994 | |
| FR | 2699868 A1 * | 7/1994 | |
| JP | 03005237 A * | 1/1991 | |
| RU | 2015036 | 6/1994 | |

* cited by examiner

MOTOR VEHICLE WITH A CONVERTIBLE BODY

CROSS-REFERENCE TO RELATED APPLICATIONS

This application is a continuation of International Application No. PCT/RU2005/000690, filed Dec. 29, 2005 which claims the benefit of priority from Russian Application No. 2005/121511 filed Jul. 4, 2005. The disclosures of the prior applications are hereby incorporated herein in its entirety by reference.

TECHNICAL FIELD

The invention relates to the automotive industry, in particular, to motor vehicles provided with convertible bodies.

BACKGROUND

Known are motor vehicles with convertible bodies of different design with a chamber in the rear part of the body to hold a hard folding roof (Russian Federation patent No. 2015036 published in 1994; U.S. Pat. No. 4,634,171 published in 1987; U.S. Pat. No. 5,090,764 published in 1992; U.S. Pat. No. 5,649,733 published in 1997; USA application No. 2004061352 published in 2004).

In motor vehicles of the known designs the chamber in the rear part of the body with the folded hard roof is reduced to a volume occupied by the roof sections. To decrease the volume occupied by the hard top of the body, it is multi-link manufactured with a lot of interacting links. A great number of structural components complicates and raises the price of the motor vehicle design and requires high accuracy at the manufacture and assembly of separate components.

Known is a motor vehicle (U.S. Pat. No. 6,347,828 published in 2002), containing a body with a two-piece roof placed vertically in a chamber located behind the seats. This design allows the boot to be free from the folded hard top. The drawback to this design is a complex mechanism of the roof conversion and considerable volume occupied by the folded roof.

Known is a motor vehicle (U.S. Pat. No. 6,595,572 published in 2003), which body has a hard folding top, consisting of two pivotally connected front and rear roof sections capable of rotating with respect to each other and to the motor vehicle body. In the initial position with the roofed body the front section of the roof is adjacent to the windscreen frame, while the rear section is hingedly fixed on the motor vehicle body in its rear part. In the end position with the opened roof the sections rotate relative to each other and motor vehicle body and are placed in its rear part and closed with a movable cover.

The drawback to this design is a considerably lost useful volume occupied with the folded roof sections, and also the roof folding mechanism's complexity.

The above considered hard folding roof designs are limited to use in motor vehicles with engines located in the front part of the body (front-mounted engines) only and can not be used in motor vehicles with mid- and rear-mounted engines for reasons of insufficient space to hold the folded roof in case of the rear-mounted engines. Besides, the existing hard folding roof designs are used with 'sedan' type bodies only that have a separate boot volume and can not be used in widely accepted 'hatchback' type bodies.

SUMMARY

The object of this invention lies in simplifying the design and extending of the usage of hard folding roofs in motor vehicles of all possible types of engine mounting (front-, mid- and rear-mounted engines). As well as potential use of convertible roofs in 'hatchback' type motor vehicles.

The essence of the invention is as follows.

A motor vehicle comprises a body provided with seats and a convertible roof, consisting of a front section adjacent to a windscreen frame, and a rear section, which is hingedly fixed in the rear part of the vehicle. Both sections are hingedly connected to each other and are constructed in such a way that they are capable of rotating relative to each other and the body from the initial position to the end position and of being placed in the rear part of the body. When the convertible roof is placed in the rear part of the body, the front section thereof occupies a substantially vertical position directly behind the seats, and the rear section occupies a substantially horizontal position in the rear part of the body.

The front section of the roof where it is joined to the windscreen frame is shaped to the body bottom shape behind the seats.

The front roof section embodiment is capable of partially overlapping the rear section, wherein at least one part of the front section overlapping the rear section is made of a transparent material.

BRIEF DESCRIPTION OF THE DRAWINGS

The drawings provided give a schematic view of the offered motor vehicle.

DETAILED DESCRIPTION OF EXAMPLE EMBODIMENTS

Figure 1:
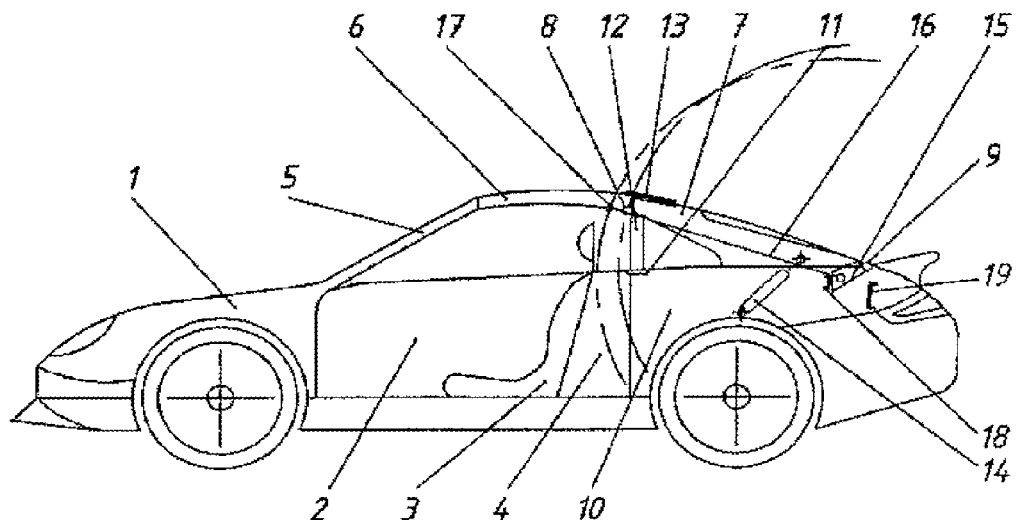
FIG. 1-7 give a motor vehicle with a differently positioned convertible body: from the initial closed to the end opened position.
Figure 2:
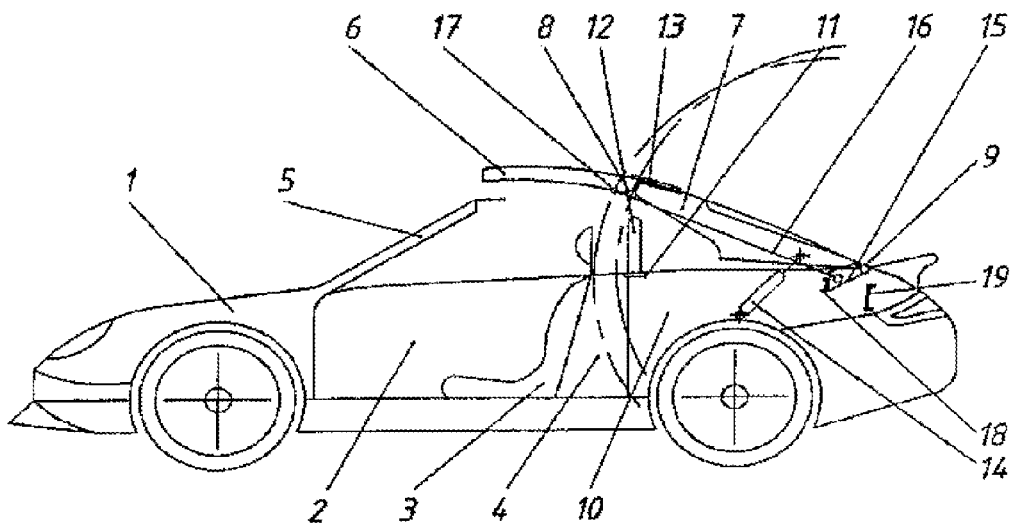
Figure 3:
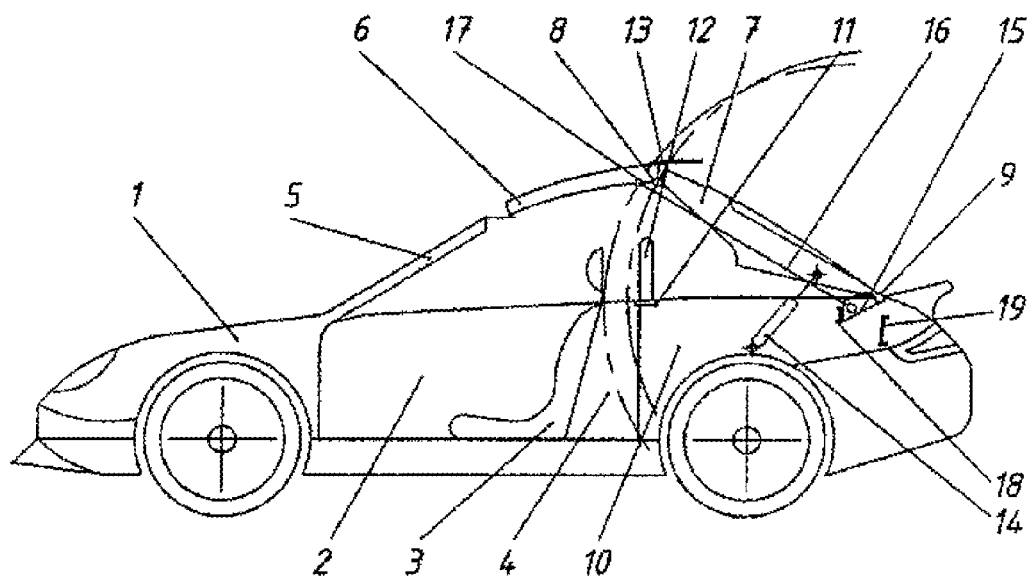
Figure 4:
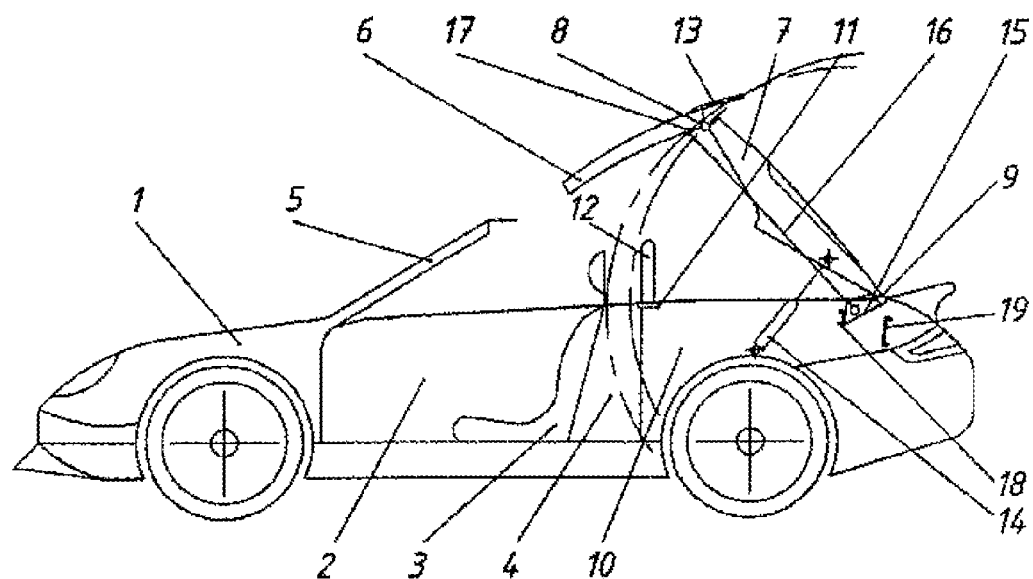

Convertible body of a motor vehicle 1 includes passenger compartment 2 with seats 3, behind which there is chamber 4, windscreen frame 5, hard two-piece folding roof, consisting of front section 6 and rear section 7. Front section 6 of the roof in the closed position is adjacent to windscreen frame 5, rear section 7 of the roof is connected through hinges 8 with front section 6 of the roof from one end, and fixed through hinges 9 on the body from the other end. In the rear part of the motor vehicle there is chamber 10, which can hold a boot (front-mounted engine) or engine (rear- or mid-mounted engine), depending on the motor vehicle's lay-out diagram.

Behind seats 3 on body 1 strength beam 11 with safety rails 12 is fixed. Hinges 8 are placed so that part 13 of front section 6 of the roof in its closed position overlaps rear section 7. Part 13 of front section 6 of the roof overlapping the rear section part is made of a transparent material.

Rear section 7 is connected to body 1 of the motor vehicle through jacks 14.

Straps 15 are hingedly-fixed on the rear section, to which levers 16 are fixed from one end, while the other end of levers 16 is fixed through hinges 17 on front section 6 of the folding roof.

Two electromagnetic controlled stops are mounted on body 1: front stop 18 and rear stop 19 that limit straps 15 movement. At this, straps 15 are fixed on the rear section of the roof so that they can move relative to it only after a certain force is exceeded (for instance, with the aid of a friction hinge).

Front section 6 of the roof where it is joined to windscreen frame 5 is shaped to the body bottom shape behind the seats and in its central zone has concave outline 20 corresponding to a body tunnel curve behind seats 3.

To convert the body with the closed hard roof into an open body with the aid of jacks 14, sections 6 and 7 of the hard roof jointly go up rotating relative to hinges 9. At this, the front edge of section 6 goes away from windscreen frame 5 and strap 15, moving along with section 7, through levers 16 and hinges 17 and 8 holds sections 6 and 7 of the roof in the closed initial position. As jacks 14 keep moving, strap 15 interacts with front stop 18 and stops relative to body 1 of the motor vehicle. When straps 15 contact stops 18, a force developed by jacks 14 exceeds a force holding straps 15 relative to section 7 and further movement of section 7 relative to hinges 9 by jacks 14 causes the front section to rotate on hinges 8 relative to rear section 7 with the aid of levers 16 and hinges 17.

Figure 5:
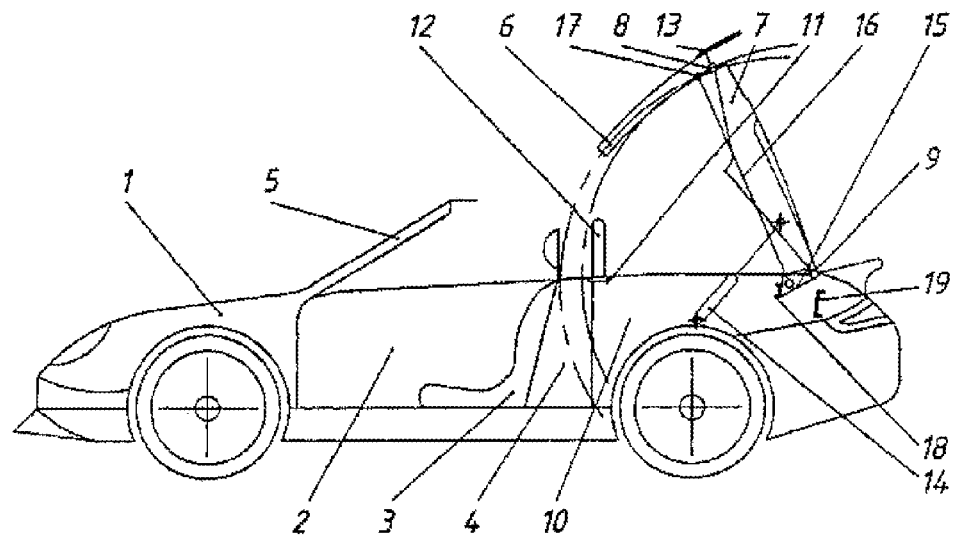
Figure 6:
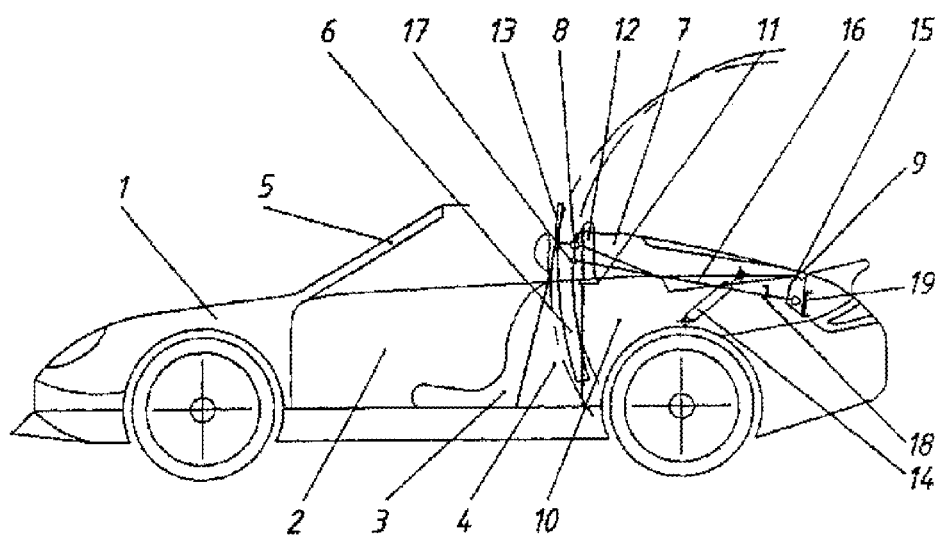
Figure 7:
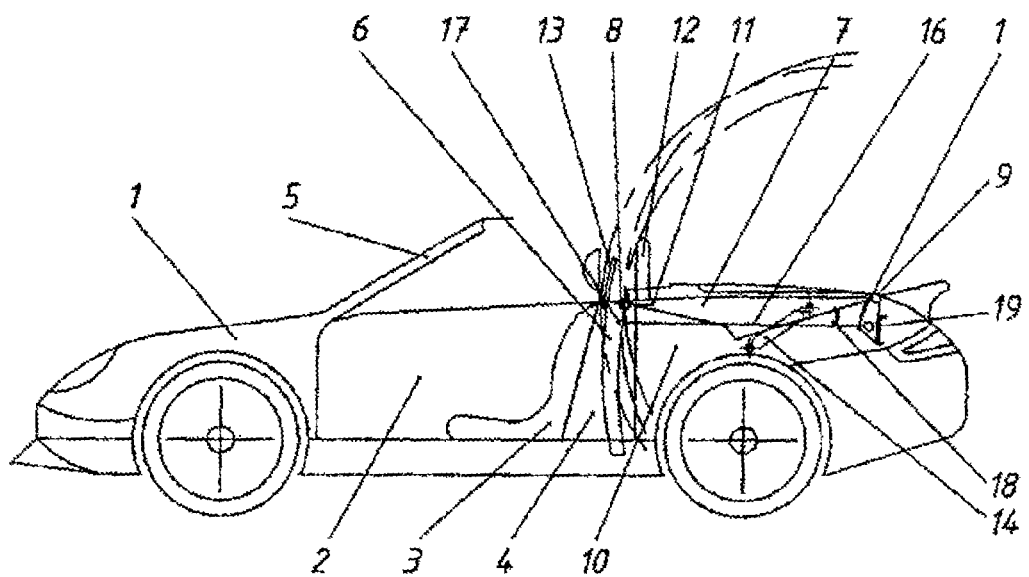
Figure 8:
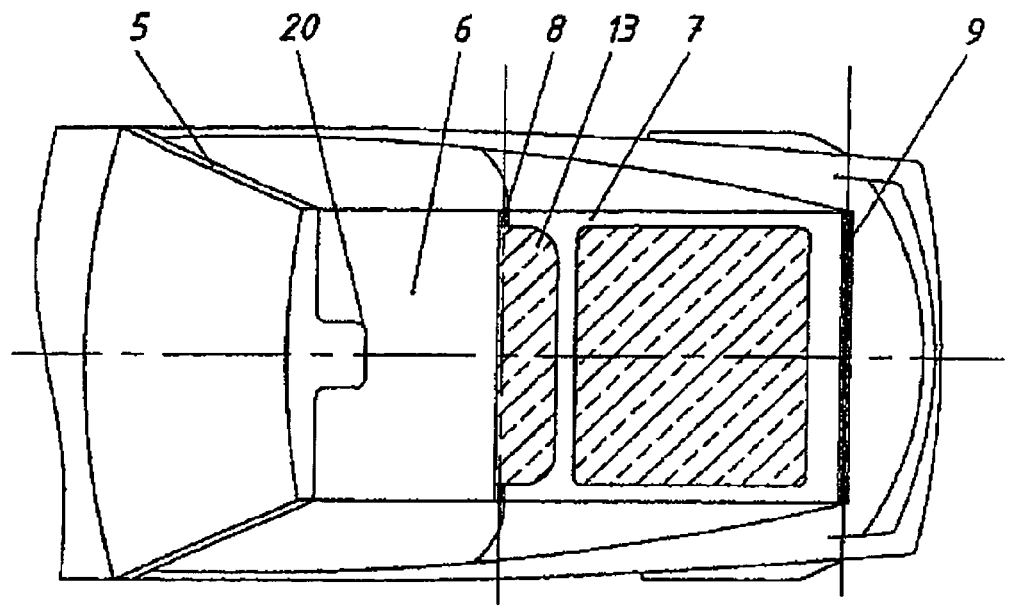
in FIG. 8 a motor vehicle's view from above is given with the roof closed.
Figure 9:
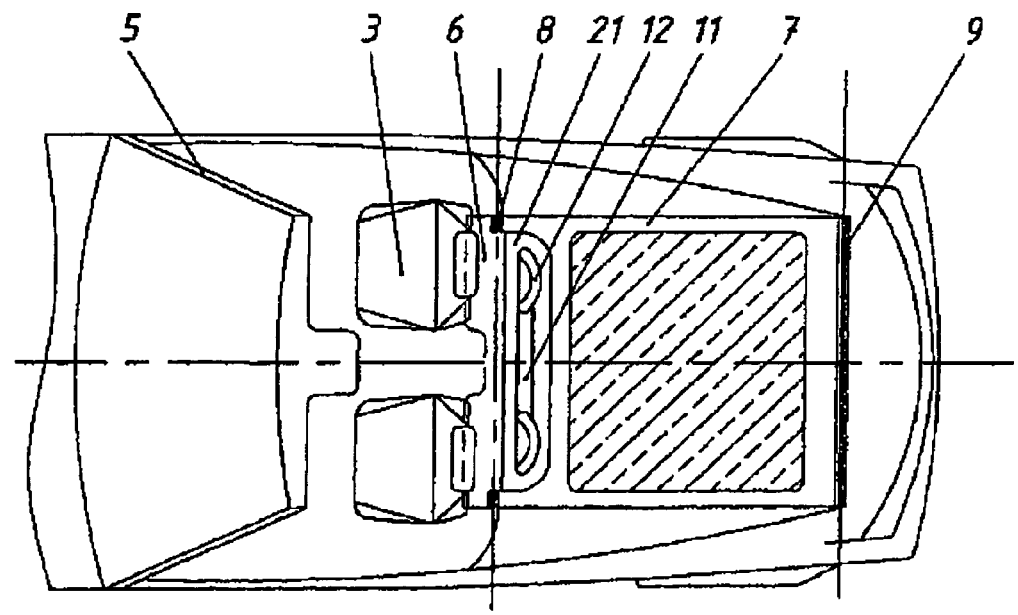
In FIG. 9 a motor vehicle's view from above is given with the roof opened.

As jacks 14 and rear section 7 (FIG. 5) reaches the extreme top position, front section 6 is held by hinges 8 and 17, straps 15, and levers 16 in L-shaped position relative to section 7; at this, both sections form an angle close to 90°. Part 13 of front section 6 of the roof overlapping the rear section opens opening 21 in rear section 7 equal to the overlapped space.

As jacks 14 move backwards, L-shaped sections 6 and 7 rotate jointly relative to hinges 9; at this, straps 15 go away from front stops 18 and owing to a fixing force of straps 15 of rear section 7 (for instance, a friction hinge), levers 16, and hinges 8 and 17 the mutual positional L-shaped relationship of sections 6 and 7 of the roof, when coming down, does not change.

As L-shaped folded sections 6 and 7 keep going down, the front edge of section 6 finds itself in chamber 4 behind seats 3 of body 1, straps 15 interact with rear stop 19 and with the aid of levers 16 and hinges 8 and 17, while keeping moving down, change the mutual positional relationship of section 6 relative to section 7. In the extreme down position of the mechanism section 6 takes up a vertical position, resting with its front edge against the body bottom, and concave outline 20 of the front edge encloses the body tunnel, sealing the compartment behind the seats. Part 13 of section 6 in its closed position overlapping rear section 7 and made of a transparent material, protrudes from the seat backs and acts as a windproof screen; at this, it is no hindrance to the visibility backwards through the rear-view mirror of the compartment. Opening 21 equal in size to the overlapped space of sections 6 and 7 encloses strength beam 11 and leaves a space for protruding safety rails 12. Rear section 7 of the roof is located in the rear part of the body substantially in a horizontal position and acts either as a boot lid (front-mounted engine) or engine compartment lid (mid- and rear-mounted engine).

Reverse conversion of the body is performed in reverse sequence. Jacks 14 start lifting section 7, rotating it round hinges 9. At the initial stage of the turn electromagnetic controlled stop 19 is energized and holds straps 15 in the extreme position; at this, movement of front section 6 of the roof is realized through levers 16, hinges 8 and 17 in a circular path, ensuring its leaving the limited space of chamber 4. As the front edge of section 6 leaves chamber 4, electromagnetic controlled stop is de-energized and straps 15 start moving along with rear section 7 due to hinges 9 friction and through levers 16 provide continuous joint L-shaped position (bent to an angle close to 90°) of sections 6 and 7 relative to each other until reaching the mechanism's upper position.

As straps 15 reach the top extreme position, they interact with energized electromagnetic controlled stops 18. After that jacks 14 start lowering down section 7, rotating it round hinges 9; at this, straps 15 keep contacting electromagnetic controlled stops 18 and as section 7 keeps moving, section 6 of the roof through levers 16 and hinges 8 and 17 gradually changes its angle position relative to section 7 from a closed to 90° in the top point to a closed to 0 degrees in the down point. When sections 6 and 7 close in and opening 21 closes, stops 15 are de-energized and with further downward movement sections 6 and 7 get lowered together till the front edge of section 6 contacts windscreen frame 5.

The body conversion mechanism takes its initial position and is ready for the next folding cycle.

The offered invention permits to simplify the design of a motor vehicle with a convertible body and be able to use hard folding roofs in motor vehicles with differently positioned engines (front- mid-, and rear-mounted engines), as well as in motor vehicles with 'a hatchback' type body.

What is claimed is:

1. A motor vehicle, comprising a body provided with seats, one or more safety rails positioned behind the seats, and a convertible roof, consisting of a front section adjacent to a windscreen frame, and a rear section, which is hingedly fixed in the rear part of the vehicle, wherein both sections are hingedly connected to each other and are constructed in such a way that both sections are capable of rotating relative to each other and the body from the initial position to the end position and of being placed in the rear part of the body, characterized in that with the convertible roof's rear location the front section of the roof occupies a substantially vertical position between the seats and the safety rails, and the rear section occupies a substantially horizontal position behind the safety rails, wherein the rear section is an external shape-generating panel of the rear part of the vehicle.

2. The motor vehicle of claim 1, characterized in that the front section is made so that a portion of the front section partially overlaps the rear section, wherein at least one part of the front section, overlapping the rear section, is made of a transparent material.

* * * * *